US012566894B2

(12) United States Patent
Babu S et al.

(10) Patent No.: US 12,566,894 B2
(45) Date of Patent: Mar. 3, 2026

(54) MICRO-ARCHITECTURAL DATA PROTECTION

(71) Applicant: DELL PRODUCTS L.P., Round Rock, TX (US)

(72) Inventors: Shekar Babu S, Bangalore (IN); D R Thippeswamy, Tumkur District (IN); Niyathi Shenoy K, Kasaragod (IN); Dayananda Angadi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 18/454,862

(22) Filed: Aug. 24, 2023

(65) Prior Publication Data

US 2025/0045466 A1     Feb. 6, 2025

(30) Foreign Application Priority Data

Aug. 2, 2023    (IN) .............................. 202311051954

(51) Int. Cl.
| | |
|---|---|
| *G06F 21/78* | (2013.01) |
| *G06F 12/14* | (2006.01) |
| *G06F 21/60* | (2013.01) |
| *G11C 8/20* | (2006.01) |
| *G11C 8/16* | (2006.01) |
| *G11C 25/00* | (2006.01) |

(52) U.S. Cl.
CPC .......... *G06F 21/78* (2013.01); *G06F 12/1416* (2013.01); *G06F 21/604* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 7,725,739 B2 * | 5/2010 | Lelikov ................... | G06F 21/85 |
| | | | 713/193 |
| 8,171,309 B1 * | 5/2012 | Poo ..................... | G06F 11/3648 |
| | | | 713/192 |
| 10,725,845 B2 * | 7/2020 | Lee ....................... | G06F 21/575 |
| 2015/0193144 A1 * | 7/2015 | Bilas ...................... | G06F 3/061 |
| | | | 711/113 |
| 2021/0385683 A1 | 12/2021 | Boyapalle et al. | |
| 2022/0179750 A1 | 6/2022 | Saad et al. | |
| 2023/0140209 A1 | 5/2023 | Suryanarayana et al. | |
| 2025/0068777 A1 * | 2/2025 | Babu S ................... | G06F 21/82 |

* cited by examiner

*Primary Examiner* — Venkat Perungavoor
(74) *Attorney, Agent, or Firm* — Larson Newman, LLP

(57)     ABSTRACT

An information handling system in response to detecting sensitive data, gets a memory allocated to the sensitive data from a secure zone of a dual in-line memory module. The system also blocks processes from access to the memory allocated to the sensitive data from the secure zone using security descriptors and access the sensitive data from the secure zone of the dual in-line memory module based on the security descriptors. In addition, the system executes the sensitive data in a firmware remapped memory and cache address line.

20 Claims, 11 Drawing Sheets

100 ⟶

Information Handling System

102 Processor

104 Processor

134 Video Display

120 Memory

122

110 106 Chipset 108

130 136 Graphics Interface

132

112

140 NVRAM

142 BIOS/ EFI

192

170 I/O Interface

150 Disk Controller

176 TPM

180 Network Interface

174 Add-On Resource

172

156 ODD

152

154 HDD

190 BMC

194

182

160 Disk Emulator 164 162

Solid State Drive

500

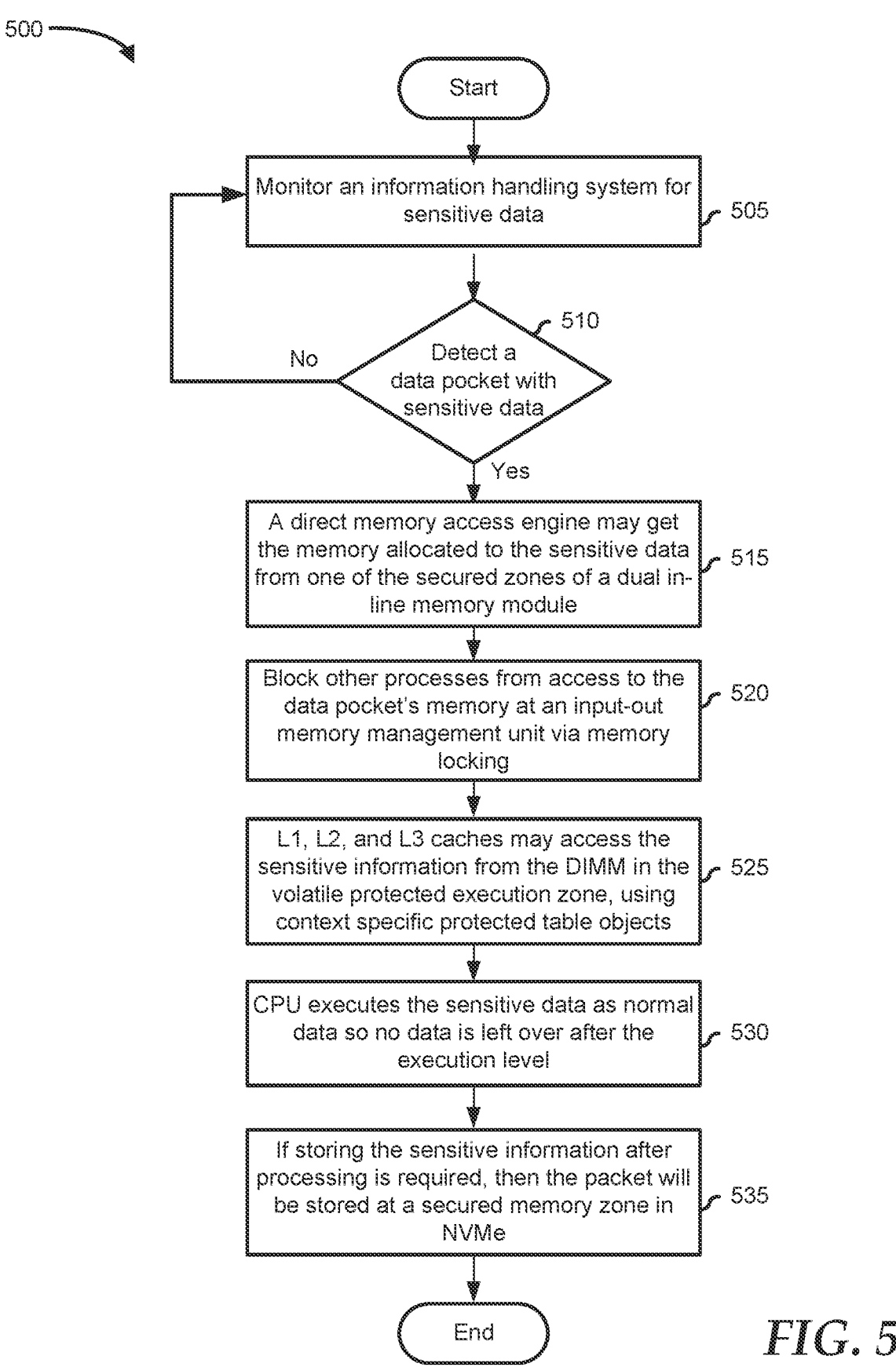

Start

Monitor an information handling system for sensitive data — 505

Detect a data pocket with sensitive data — 510

No

Yes

A direct memory access engine may get the memory allocated to the sensitive data from one of the secured zones of a dual in-line memory module — 515

Block other processes from access to the data pocket's memory at an input-out memory management unit via memory locking — 520

L1, L2, and L3 caches may access the sensitive information from the DIMM in the volatile protected execution zone, using context specific protected table objects — 525

CPU executes the sensitive data as normal data so no data is left over after the execution level — 530

If storing the sensitive information after processing is required, then the packet will be stored at a secured memory zone in NVMe — 535

End

*FIG. 5*

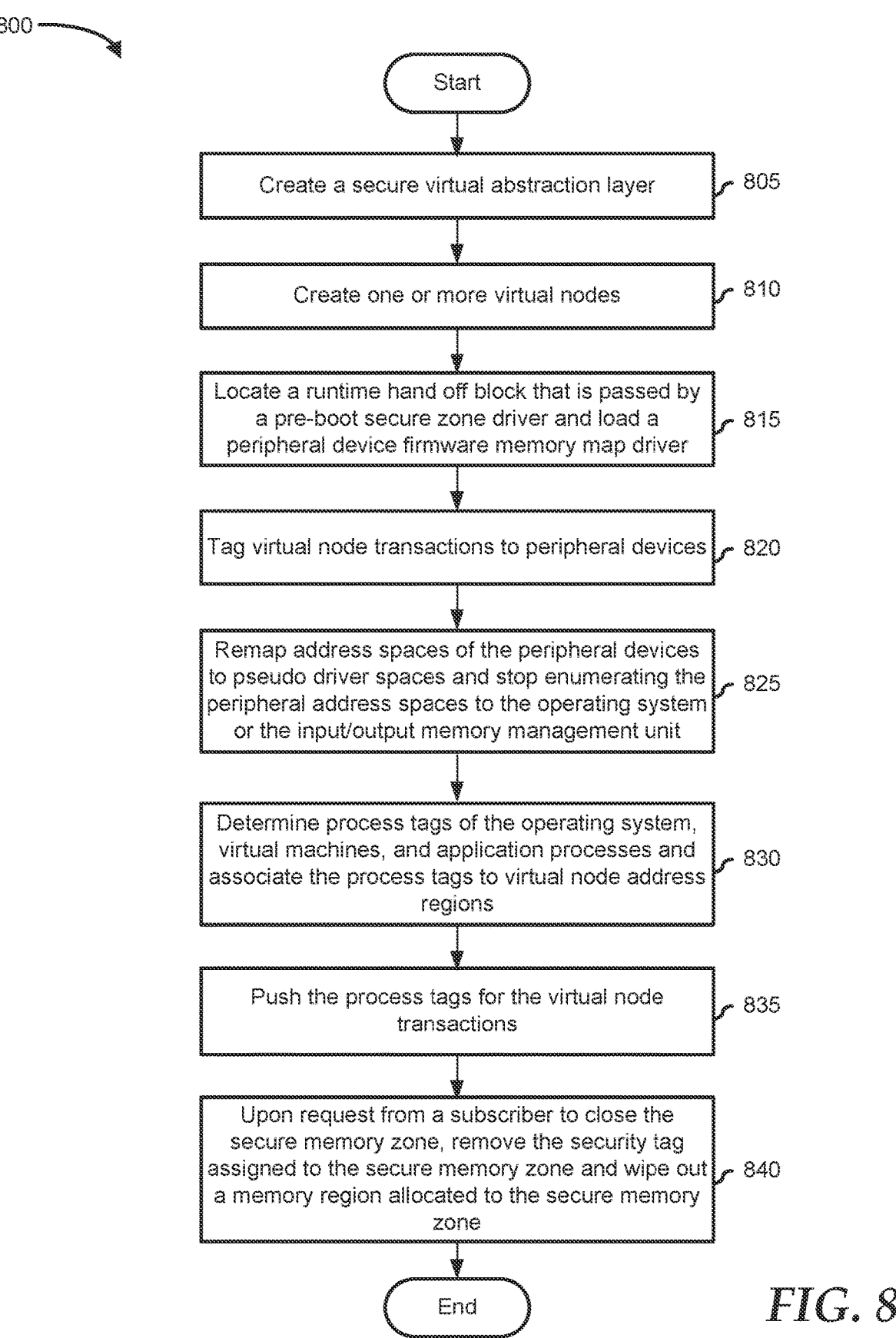

800

Start

Create a secure virtual abstraction layer — 805

Create one or more virtual nodes — 810

Locate a runtime hand off block that is passed by a pre-boot secure zone driver and load a peripheral device firmware memory map driver — 815

Tag virtual node transactions to peripheral devices — 820

Remap address spaces of the peripheral devices to pseudo driver spaces and stop enumerating the peripheral address spaces to the operating system or the input/output memory management unit — 825

Determine process tags of the operating system, virtual machines, and application processes and associate the process tags to virtual node address regions — 830

Push the process tags for the virtual node transactions — 835

Upon request from a subscriber to close the secure memory zone, remove the security tag assigned to the secure memory zone and wipe out a memory region allocated to the secure memory zone — 840

End

FIG. 8

| Source 1005 | Destination 1010 | Parent GUID 1015 | Child Flag 1020 | Child GUID 1025 | Memory Size 1030 | Tag Level 1035 |
|---|---|---|---|---|---|---|
| | | Unique GUID value of the requester | Binary value indicating a status of the whether the child's GUID is present or not | GUID of the requester's child device | Memory size to be assigned in a secured memory zone | Security tag level from one of below: |
| Virtual Machine | Virtual Machine | | | | | Virtual Machine |
| Cloud Service | Cloud Service | | | | | Operating System |
| SSD | SSD | | | | | Hypervisor |
| Peripherals | Peripherals | | | | | BIOS |
| Graphics Card | Graphics Card | | | | | Container |
| Network Interface Controller | Network Interface Controller | | | | | |

*FIG. 10*

Figure 11:
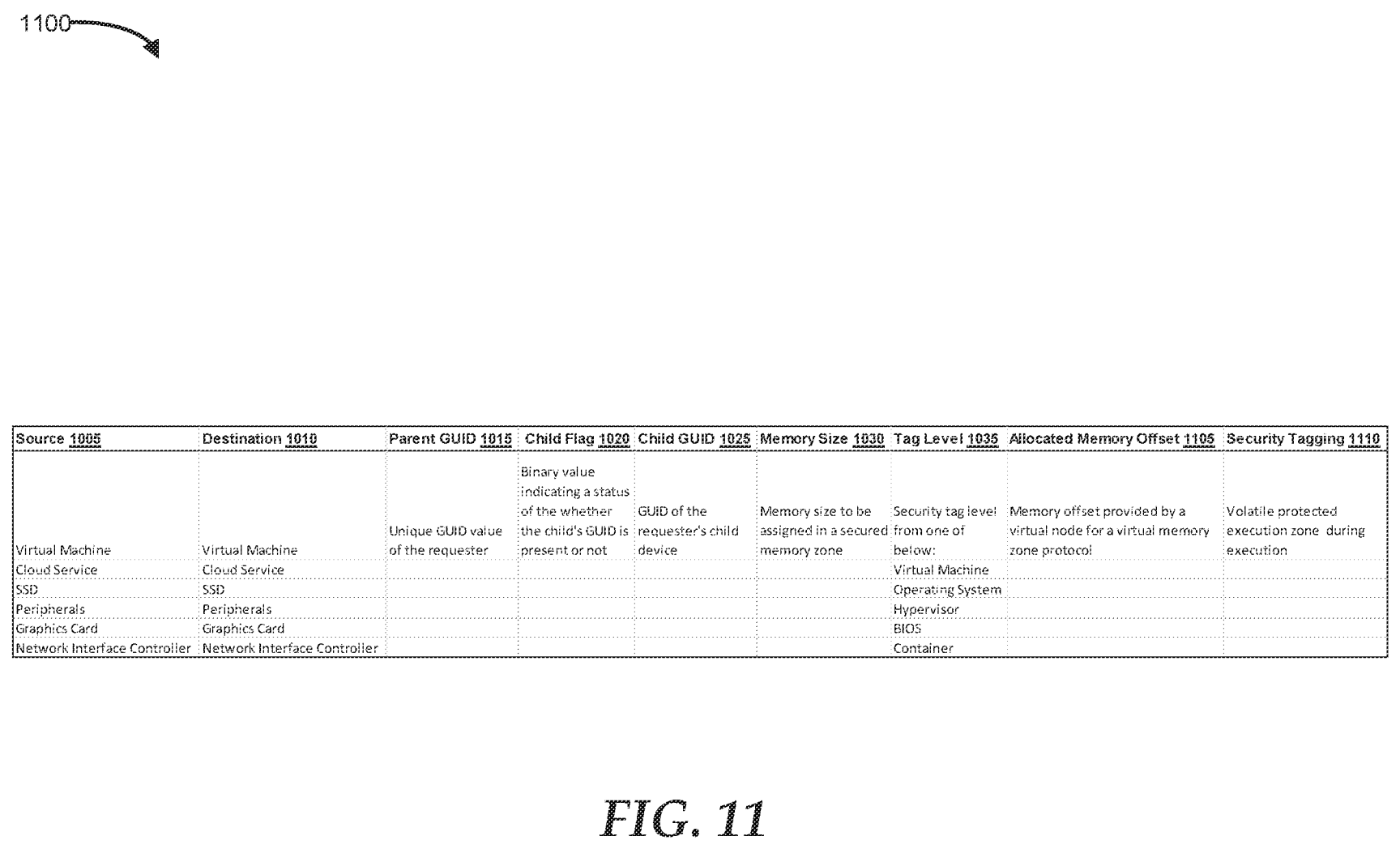

| Source 1005 | Destination 1010 | Parent GUID 1015 | Child Flag 1020 | Child GUID 1025 | Memory Size 1030 | Tag Level 1035 | Allocated Memory Offset 1105 | Security Tagging 1110 |
|---|---|---|---|---|---|---|---|---|
| | | Unique GUID value of the requester | Binary value indicating a status of the whether the child's GUID is present or not | GUID of the requester's child device | Memory size to be assigned in a secured memory zone | Security tag level from one of below: | Memory offset provided by a virtual node for a virtual memory zone protocol | Volatile protected execution zone during execution |
| Virtual Machine | Virtual Machine | | | | | Virtual Machine | | |
| Cloud Service | Cloud Service | | | | | Operating System | | |
| SSD | SSD | | | | | Hypervisor | | |
| Peripherals | Peripherals | | | | | BIOS | | |
| Graphics Card | Graphics Card | | | | | Container | | |
| Network Interface Controller | Network Interface Controller | | | | | | | |

MICRO-ARCHITECTURAL DATA PROTECTION

CROSS-REFERENCE TO RELATED APPLICATION

Related subject matter is contained in co-pending U.S. patent application Ser. No. 18/454,869 entitled "PERIPHERAL DEVICE DATA PROTECTION," filed Aug. 24, 2023, the disclosure of which is hereby incorporated by reference.

FIELD OF THE DISCLOSURE

The present disclosure generally relates to information handling systems, and more particularly relates to micro-architectural data protection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system in response to detecting sensitive data, gets a memory allocated to the sensitive data from a secure zone of a dual in-line memory module. The system also blocks processes from access to the memory allocated to the sensitive data from the secure zone using security descriptors and access the sensitive data from the secure zone of the dual in-line memory module based on the security descriptors. In addition, the system executes the sensitive data in a firmware remapped memory and cache address line.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a flowchart of a method for micro-architectural data protection, according to an embodiment of the present disclosure;

FIG. 8 is a flowchart of a method for peripheral device data protection, according to an embodiment of the present disclosure;

FIG. 10 is a table of a secure memory request data format or a structure from a peripheral subsystem, according to an embodiment of the present disclosure; and FIG. 11 is a table of a secure memory response data format or structure to a peripheral subsystem, according to an embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a I²C bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I²C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Micro-architectural data sampling (MDS) may allow a malicious user who can locally execute code on a system to infer the values of secret data otherwise protected by architectural mechanisms. Although it may be difficult to target data on a system using these methods, malicious actors may be able to infer secrets by collecting and analyzing large amounts of data. For example, micro-architectural data movements while in an execution path from source to destination are vulnerable as the data may be exposed to risk while being accessed from the cloud and during execution. In addition, attackers may be able to run unprivileged code on an information handling system and steal data from other programs running on the same computer. With rogue in-flight data load attacks, attackers can also exploit MDS vulnerabilities to mount attacks and leak sensitive data. Accordingly, to address these and other concerns, the present disclosure provides a system and method to provide a protected execution zone across system memory and CPU cache offering protection to context-specific data in an execution pipeline.

Figure 2:
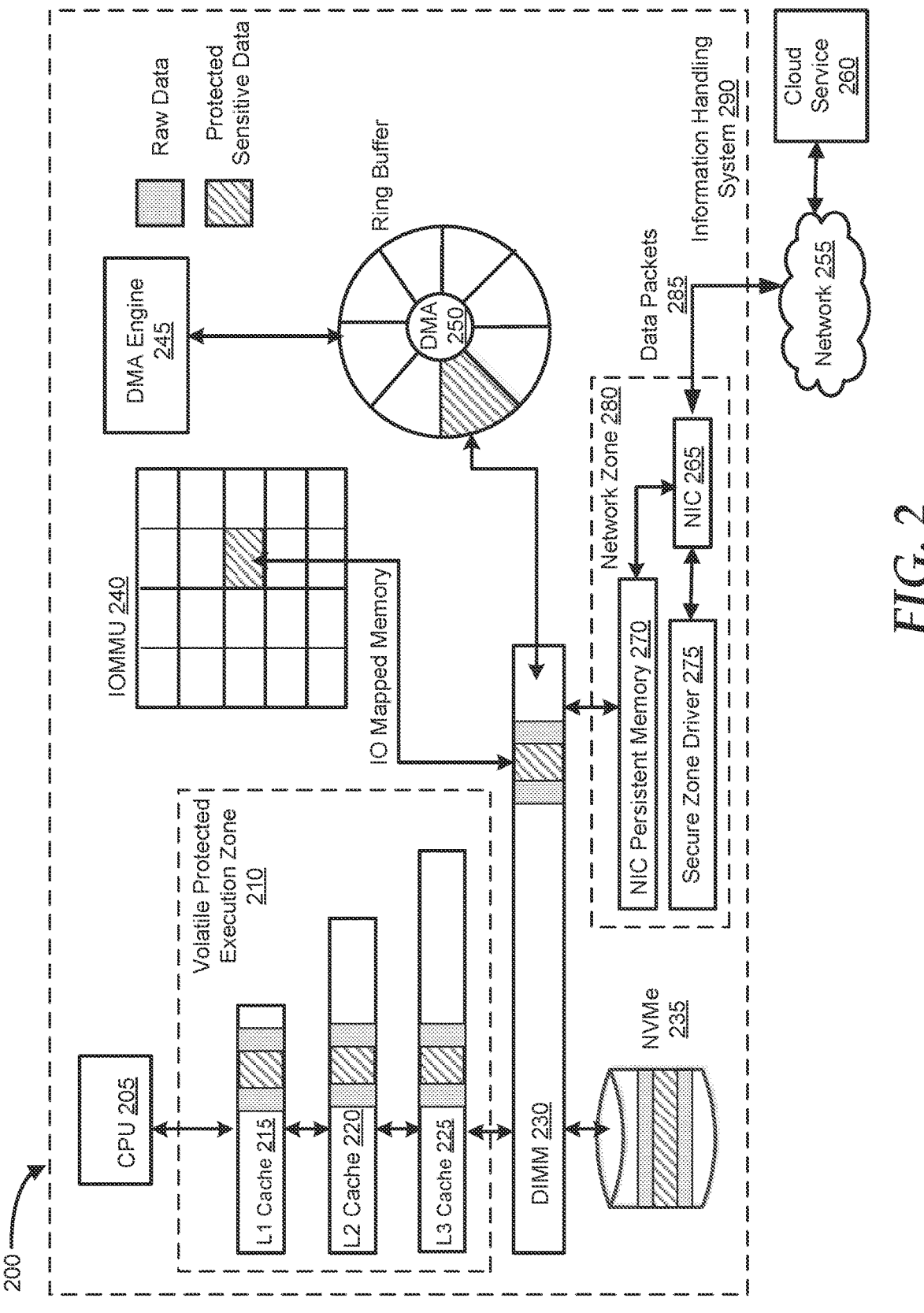
FIGS. 2-3 are block diagrams of a system for dynamic micro-architectural data protection, according to an embodiment of the present disclosure.

FIG. 2 shows a system 200 configured for dynamic micro-architectural data protection at an information handling system which is similar to information handling system 100 of FIG. 1. The protection may follow data movements as sensitive or critical data travels through the execution path from the source to its destination. System 200 includes an information handling system 290, a network 255, and a cloud service 260. Information handling system 290 includes a CPU 205, a DIMM 230, a non-volatile memory express (NVMe) 235, an input-output memory management unit (IOMMU) 240, a direct memory access (DMA) engine 245, a DMA 250, and a network zone 280 which includes a network interface controller 265, a NIC persistent memory 270, and a secure zone driver 275.

Network 255 may be a public network, such as the Internet, a physical private network, a wireless network, a virtual private network (VPN), or any combination thereof. Cloud service 260 may be an infrastructure, platform, or application that is accessible to users of information handling system 290, which is similar to information handling system 100 of FIG. 1, via network 255. However, one of ordinary skill in the art may appreciate the system and method of the present disclosure may be applicable to provide micro-architectural data protection for data from other sources apart from cloud service 260. For example, the present disclosure may protect data packets from a local data storage or similar.

Data packets received from various sources, such as the cloud can include sensitive data. As used herein, sensitive data may include confidential data, critical data, or similar. While sensitive data may be protected, such as encrypted at certain points, the sensitive data may not be protected when the data is in an execution path. This is where the present disclosure provides data packet formatting and secure execution zones to address the vulnerability of the data packets in the execution path. The data packet formatting may identify the security tags that are associated with the raw payload that includes the sensitive data. In addition, the secure execution zones provide a volatile protected execution zone 210 in the execution paths that includes L1, L2, and L3 cache levels until the CPU. Volatile protected execution zone 210 may create a cache boundary such that only a particular process identifier associated with the context of a memory transaction with a sensitive data can read and write in the protected areas. Thus, execution of the sensitive data is limited to the particular process identifier.

In one embodiment, as data packets 285 are received at network interface controller 265 and loaded to NIC persistent memory 270, wherein data packets 285 may be from cloud service 260 via network 255, secure zone driver 275 may execute to detect the presence of sensitive data in data packets 285. If sensitive data is found, as the sensitive data moves through DIMM 230, security descriptors, such as those depicted in a context-specific protected table (CSPT) 305 of FIG. 3, may be associated with the sensitive data creating a secure zone as protection for the sensitive data. The secure zone, also referred to as a sliced protection zones may be created at system memory CPU cache, storage area, non-volatile memory, such as NV-RAM, SPI flash, a complementary metal-oxide semiconductor, etc. The entries in the CSPT 305 may be updated at execution and the sliced protection zones may move along with the offsets. This way, the sensitive data is protected as it moves through storage or network buffer or network zone to the CPU cache.

Further, DMA engine 245 may provide that DMA 250 can get the memory allocated from the secure zone in DIMM 230 for the protected sensitive data. As the security descriptors may move along with the sensitive data, the security descriptors can ensure that the memory allocated for the sensitive data is blocked from access at IOMMU 240 via memory locking.

A CPU cache which includes L1 cache 215, L2 cache 220, and L3 cache 225 may access the sensitive data in DIMM 230 inside a volatile protected execution zone 210 during execution of associated instructions by CPU 205. Volatile protected execution zone 210 may be used to ensure that context-specific sensitive data in an execution pipeline is protected. In particular, volatile protected execution zone 210 is shown to represent a firmware remapped memory and cache address lines across the system memory and CPU cache. The remapped memory region may be interfaced with CSPT 305 of FIG. 3. Also, the protected sensitive data may be stored if needed in NVMe 235 along with its security descriptors. In addition, volatile protected execution zone 210 may be created at system memory, storage area of the CPU cache, and nonvolatile memory like NVMe 235, NV-RAM, SPI flash, a complementary metal-oxide semiconductor, etc. Once the execution of the memory transaction is done, the secure memory zone is vacated and erased so that the barrier created by volatile protected execution zone 210 may not be broken.

Those of ordinary skill in the art will appreciate that the configuration, hardware and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
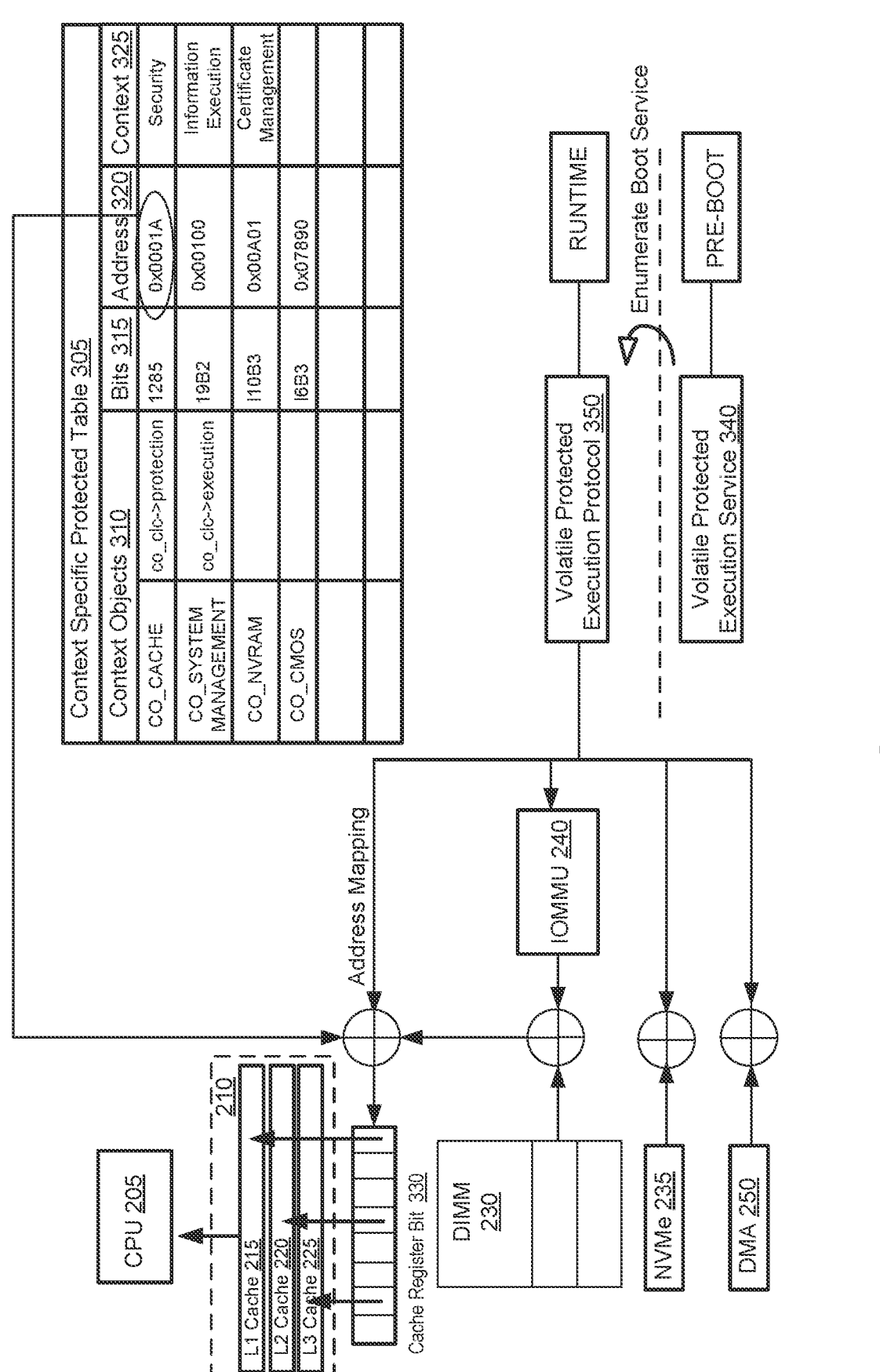

FIG. 3 shows a portion of system 200 in greater detail across the system memory and the CPU cache. This portion includes CSPT 305, a volatile protected execution service 340, volatile protected execution zone 210, DMA 250, NVMe 235, IOMMU 240, DIMM 230, a cache register bit 330, L1 cache 215, L2 cache 220, L3 cache 225, and CPU 205.

Volatile protected execution service 340 may be configured to create remapped memory regions that interface with CSPT 305 with respect to one or more security contexts. The security contexts may be converted to attributes stored in CSPT 305. For example, the security contexts may be with respect to a virtual machine context, an operating system context, etc. CSPT 305 may be a derivative of a runtime firmware map table that stores operating system or virtual machine runtime attributes.

CSPT 305 may be configured to include execution context-specific entries. For example, information associated with the sensitive data in the execution pipeline may be stored as context-specific entries and organized based on one or more attributes, such as context objects 310, bits 315, address 320, and context 325. Each of the context-specific entries may hold an offset of the sensitive data which moves in the execution context. For example, address 320 may hold an offset for bits 315. These context-specific entries in CSPT 305 may be dynamically updated during the execution time.

For example, as the sliced protected zones keep moving along with the tagged sensitive data, such as through L3 cache 225, L2 cache 220, and L1 cache 215, the offsets associated with sensitive data in CSPT 305 may get updated. As such, the tagged sensitive data may be protected during the process execution context from storage or network buffers to the CPU cache.

Memory regions for CSPT 305 may be allocated by volatile protected execution service 340 during a pre-EFI initialization phase of the boot process. The base address of CSPT 305 may be passed as a hand-off block to the driver execution environment service phase. The context-specific entries can be added into CSPT 305 at operating system runtime. The memory type of CSPT 305 may be an advanced configuration and power interface non-volatile memory so that any S3 resume/modern standby entry/exit context protection can be extended.

During exit boot services, CSPT 305 may be remapped to a firmware map table or in particular to a memory low address where the entries can grow and shrink based on the security tags. This may act as a cache address lane, wherein the sensitive data moving through the cache, IOMMU 240, and/or cache register bit 330 may be configured to lock the low memory address and make it inaccessible to the operating system, a virtual machine, a hypervisor, or other transactions. This may be done, such that an address map may be generated to protect cache address lanes, such as address 320 in CSPT 305. As such, the sensitive data may be accessed by a process associated with its context. In this example, bits 1285 in cache lane co_clc→protection with address at 0x0001A may be protected while the remaining cache address lane not included in CSPT 305 may need not be protected. For example, as bits 1285 go through L1 cache 215, L2 cache 220, and L3 cache 225, bits 1285 may remain protected as its address offsets in the cache address lane are updated.

Volatile protected execution protocol 350 may be a firmware memory zone protection protocol that works at runtime and during pre-boot as a volatile protected execution service 340. Volatile protected execution protocol 350 may be initialized during the pre-EFI initialization phase as volatile protected execution service 340 to get memory allocation for CSPT 305. A boot services enumeration may be performed during the transition from pre-boot to runtime. Volatile protected execution protocol 350 may secure the sensitive data starting at DMA mapped IOMMU 240 and on DIMM 230. Volatile protected execution protocol 350 may also perform the address mapping of addresses from DIMM 230, NVMe 235, and DMA 250. Based on CSPT 305 and the address lane generated at a cache register bit, volatile protected execution protocol 350 may determine the location of the sensitive data. In addition, volatile protected execution protocol 350 provides volatile protected execution zone 210 in the execution path of the sensitive data that includes L1 cache 215, L2 cache 220, and L3 cache 225 until the sensitive data reaches CPU 205.

Figure 4:
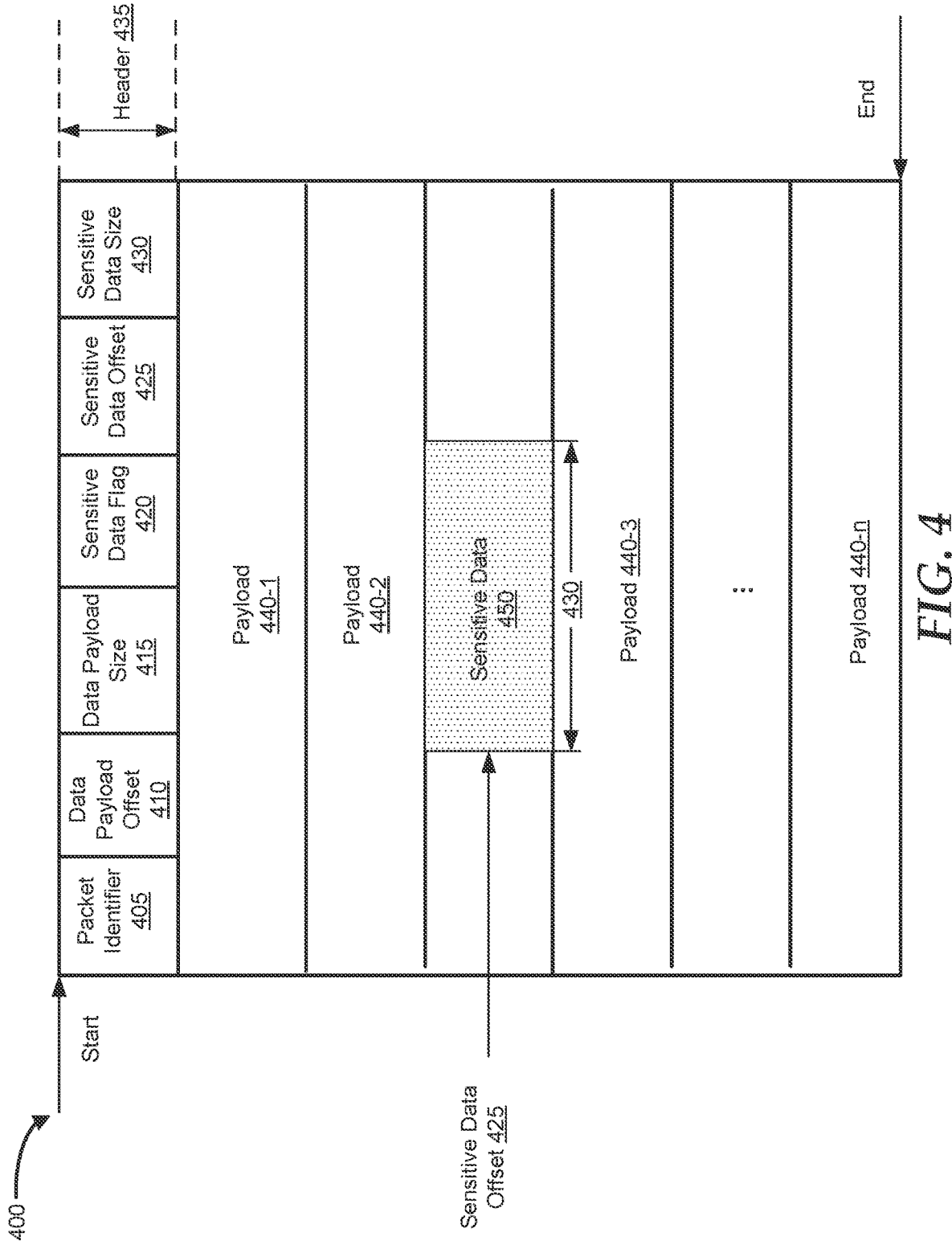
FIG. 4 is a diagram of a data binary large object that includes protected sensitive data, according to an embodiment of the present disclosure.

FIG. 4 shows a data binary large object (BLOB) 400 that includes protected sensitive data. Data blob 400 includes payloads 440-1 through 440-n that include a sensitive data 450. A data sampling method may be implemented to identify and tag sensitive data 450, such as a password, an encryption key, confidential information, etc. In this example, sensitive data 450 may be tagged using security tags in a header 435 of data blob 400. The security tags include a packet identifier 405, a data payload offset 410, a data payload size 415, a sensitive data flag 420, a sensitive data offset 425, and a sensitive data size 430. This allows the source level data protection to be extended to sensitive data 450 using firmware secure zone remaps. By using the identifiers and tags associated with the sensitive data, the movement of the sensitive data may be tracked and protected in a volatile protected execution zone across the different memories, such as at DIMM 230, CPU cache, storage (such as NVMe 235), NIC buffer, etc. Packet identifier 405 may be associated with a process identifier that is being executed in an operating system context. The volatile protected execution protocol may then track the movement of sensitive data 450 across memories until the CPU cache by using the security tags.

FIG. 5 shows a flowchart of a method 500 micro-architectural data protection. Method 500 may be performed by one or more components of system 200 of FIG. 2 and FIG. 3. However, while embodiments of the present disclosure are described in terms of system 200, it should be recognized that other systems may be utilized to perform the described method. In addition, one of skill in the art will appreciate that this flowchart explains a typical example, which can be extended to advanced applications or services in practice.

Method 500 typically starts at block 505 wherein a process may monitor an information handling system for sensitive data. For example, a secure zone driver may run in a firmware layer of an information handling system and utilize a data sampling algorithm to monitor and identify sensitive data. The method may proceed to decision block 510, wherein the secure zone driver may detect that a memory transaction may include sensitive data. If the memory transaction includes sensitive data, then the "YES" branch is taken, and the method proceeds to block 515. If the memory transaction does not include sensitive data, then the "NO" branch is taken, and the method proceeds to block 505.

At block 515, a DMA engine may get a memory allocated for the sensitive data from one of the secured zones of a DIMM, such as by using security descriptors. The method may proceed to block 520, where the security descriptors may ensure that the memory allocated for a data packet with the sensitive data is blocked from access at an IOMMU by locking the memory. The method may proceed to block 525, where at the cache level, the cache register bit may be programmed to lock the memory allocated for the sensitive data and make a present memory zone to be non-accessible to other memory transactions. Thus, creating a secured memory zone also referred to as a volatile protected execution zone.

Later L1, L2, and L3 caches may access the sensitive data from the DIMM in the volatile protected execution zone using CSPT objects. Once the volatile protected execution zone, the sensitive data may be tagged into a current execution context which is a process identifier associated with the data packet containing the sensitive data. The L1, L2, and L3 cache address lines may be hidden and not visible to other applications except to the process identifier of the current execution context. The method may proceed to block 530, where the CPU may execute the sensitive data as normal data so there may be no data left over after execution at this level. The method may proceed to block 535, where the sensitive data may be stored at a secured memory zone in a non-volatile memory express storage if storing the sensitive data after processing is required.

Figure 6:
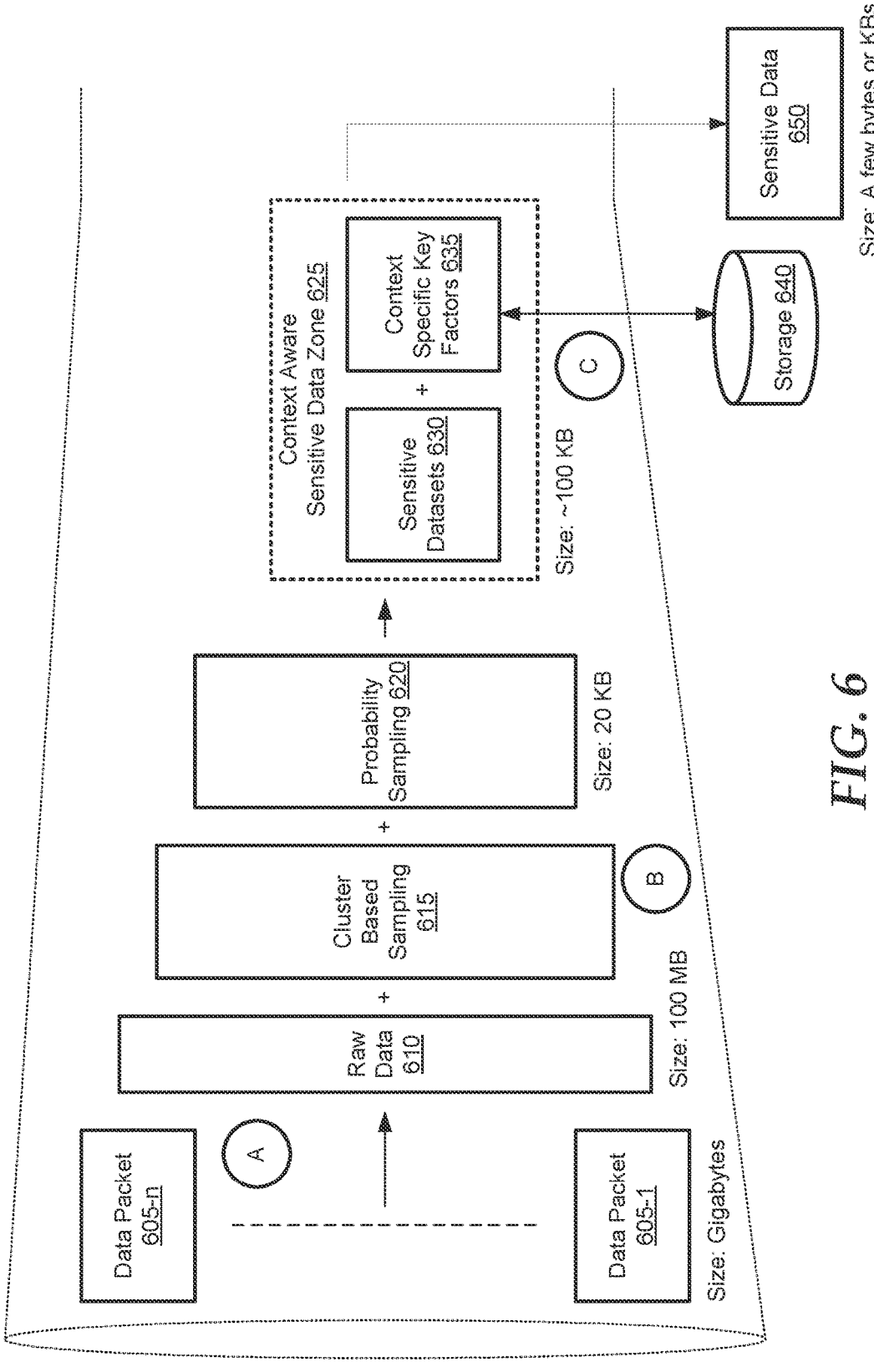
FIG. 6 is a diagram of a context-aware data sampling algorithm to reduce data processing complexity, according to an embodiment of the present disclosure.

FIG. 6 shows a diagram of a context-aware data sampling algorithm 600 to reduce data processing complexity. Context-aware data sampling algorithm 600 may be applied to data packets 605-1 through 605-n and includes a cluster-based data sampling 615, a probability sampling 620, and a context-aware sensitive data zone 625 that includes sensitive datasets 630 and context-specific key factors 635. Context-aware data sampling algorithm 600 may be applied to data packets to identify the sensitive data, such as the sensitive data protected in system 200 of FIG. 2 and FIG. 3.

FIG. 6 is annotated with a series of letters A, B, and C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, data packets 605-1 through 605-*n* may be received from one or more sources. For example, data packets 605 may be received from various sources, such as from cloud service 260 via network 255 of FIG. 1. Data packets 605 may also be received from a peripheral device at a USB dock. In one example, data packets 605 may be several gigabytes in size. Data packets 605 may include raw data 610, headers, trailers, etc. In addition, data packets 605 may be of one of various formats such as JavaScript Object Notation™, extensible markup language, or similar. Data packets 605 may be pre-processed wherein raw data 610 is extracted from data packets 605. The size of raw data 610 may be smaller in size than data packets 605 as various formatting information may be removed during the pre-processing. Accordingly, as the data is processed, the size may get increasingly smaller which reduces the complexity in identifying the sensitive data within the data packets. For example, the extracted raw data 610 may be 100 megabytes.

At stage B, cluster-based data sampling 615 and probability sampling method may be used on raw data 610 by applying a pre-defined sampling template which further results in extracting sensitive datasets 630 from raw data 610. For example, raw data 610 may be divided into clusters, and the pre-defined sampling template applied to the clusters. The pre-defined sampling template may be selected based on the format of the data packet being processed. For example, a specific template may be used for data packets in an extensible markup language. Another template may be used for data packets from a virtual machine.

At stage C, a probability sampling method with one or more context-specific key factors 635 may be applied to sensitive datasets 630 resulting in sensitive data 650. Sensitive datasets 630 may be a data payload that includes sensitive data. Context-specific key factors 635 may be context-specific and stored in a storage 640 and queried at runtime. For example, context-specific key factors 635 may be dependent on the platform, user, source data type, firmware, or an application that is consuming sensitive datasets 630. In particular, for banking applications with user login information, a banking application template with a sample user profile may be used. This results in identifying the sensitive data within the data payload. In one example, the sensitive data may be a user's password or other personally identifiable information.

When the sensitive data is identified, protection mechanisms, such as critical protection memory zone logic may be applied by a firmware memory zone protection protocol to the sensitive data allowing it to be protected across virtual machine or operating system vulnerabilities. For example, the sensitive data may be tagged with security descriptors, which track the movement of the sensitive data along the execution path. This allows for end-to-end data protection for the sensitive data inside a volatile protected execution zone, providing context-aware data execution pipeline protection.

As shown, at each stage, the size of the data being processed gets smaller, which reduces the data processing complexity. By identifying and protecting the sensitive data instead of the data packets, the micro-architectural data protection system and method in the present disclosure is efficient, which minimizes disruption to the CPU execution.

Figure 7:
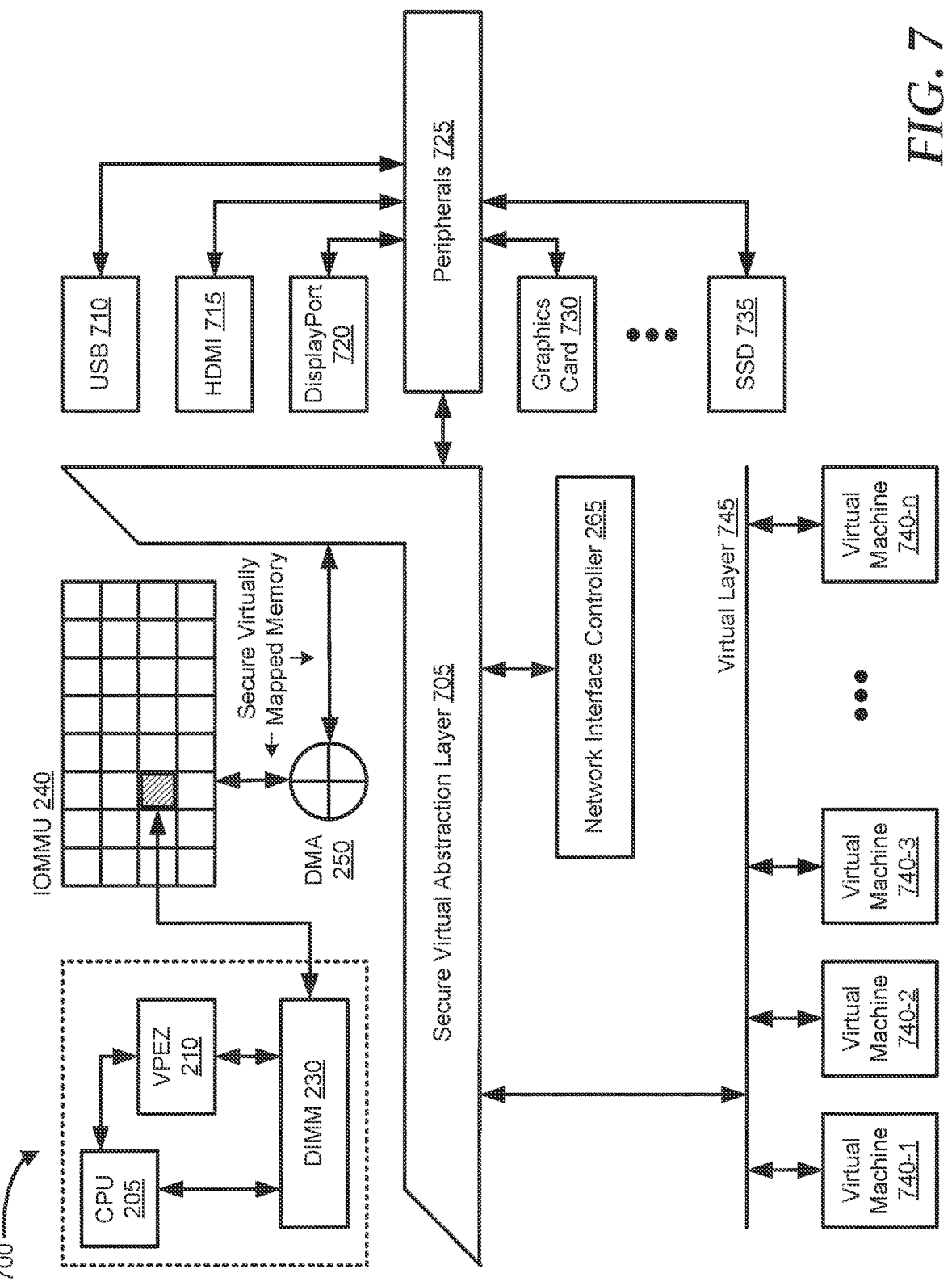
FIG. 7 is a diagram of an architecture for peripheral device data protection, according to an embodiment of the present disclosure.

FIG. 7 shows an architecture 700 for peripheral device data protection in an information handling system, which is similar to information handling system 100 of FIG. 1. Architecture 700 includes a secure virtual abstraction layer 705 that is communicatively coupled to a network interface controller 265 and peripherals 725. Peripherals 725 includes a USB 710, an HDMI 715, a DisplayPort™ 720, a graphics card 730, SSD 735, etc. Secure virtual abstraction layer 705 may also be coupled to virtual machines 740-1 through 740-*n* via a virtual layer 745.

Typically, applications running in a virtual machine can access data from L1, L2, and L3 caches to read data while accessing a DIMM. Thus, there is a possibility of data leaks by a malicious application running in the virtual machine. To minimize if not eliminate this possibility, the present disclosure provides a secure virtually mapped memory at the firmware layer to remap memory for hypervisor and virtual machine-shared transactions. Memory transactions from peripherals 725, network interface controller 265, and virtual machines 740 may pass through secure virtual abstraction layer 705 which may act as a security layer at a firmware layer to protect the sensitive data in the transactions.

A peripheral device remap with a pseudo driver, such as PCIe pseudo driver created at runtime may be used to protect vulnerabilities of peripheral data transactions. The pseudo driver may protect the address space of the peripheral data transactions. For example, a hot plug in a dock station, portable information handling system, or monitor does not expose sensitive data. Rather the sensitive data may be moved to a remap area of the pseudo driver within an IOMMU context so that the remap area is protected. A virtualized memory zone lock for the peripheral devices and/or virtual machines may be created to provide a firmware protocol locked remap memory for peripheral device data transactions and a hypervisor and virtual memory shared transactions. A firmware memory zone protection protocol may be used to dynamically create a lock on the virtual memory transactions used by the hypervisor or the virtual machines. The firmware memory zone protection protocol may be initialized at the pre-EFI initialization phase of the boot process and get a memory allocation to be used at a virtual enumeration done by the hypervisor or the virtual machines. This enumerated virtual remap may be a locked memory zone that can be dynamically shared across the operating system and virtual machines by tagging the memory type against its caller.

Data packet formatting and secure execution zones, such as a volatile protected execution zone, may be used to protect sensitive data in a memory transaction. The data packet formatting may be configured to identify and tag the sensitive data with security descriptors before the sensitive data goes to DMA 250 and IOMMU 240 for execution. For example, if a memory transaction is detected to include sensitive data, DMA 250 may get the memory allocated for the transaction and use security descriptors to block the memory allocated for the sensitive data from access at IOMMU 240. At the cache level, a virtualized memory zone lock may be created by a firmware memory zone protection protocol to lock a memory used in remapping memory allocated for the sensitive data to a particular process identifier. This disallows access from other transactions, such as hypervisor and virtual machine shared transactions to the sensitive data. Thus, restricting direct access to the L1, L2, and L3 caches in volatile protected execution zone 210 through CPU 205 and DIMM 230.

FIG. 8 is a flowchart of a method 800 for peripheral device data protection. Method 800 may be performed by one or more components of the system in FIG. 7 and FIG. 9 when sensitive data is detected at a memory transaction associated with an operating system, a virtual machine, or an application process. However, while embodiments of the present disclosure are described in terms of those systems, it should be recognized that other systems may be utilized to perform the described method. In addition, one of skill in the art will appreciate that this flowchart explains a typical example, which can be extended to advanced applications or services in practice.

Figure 9:
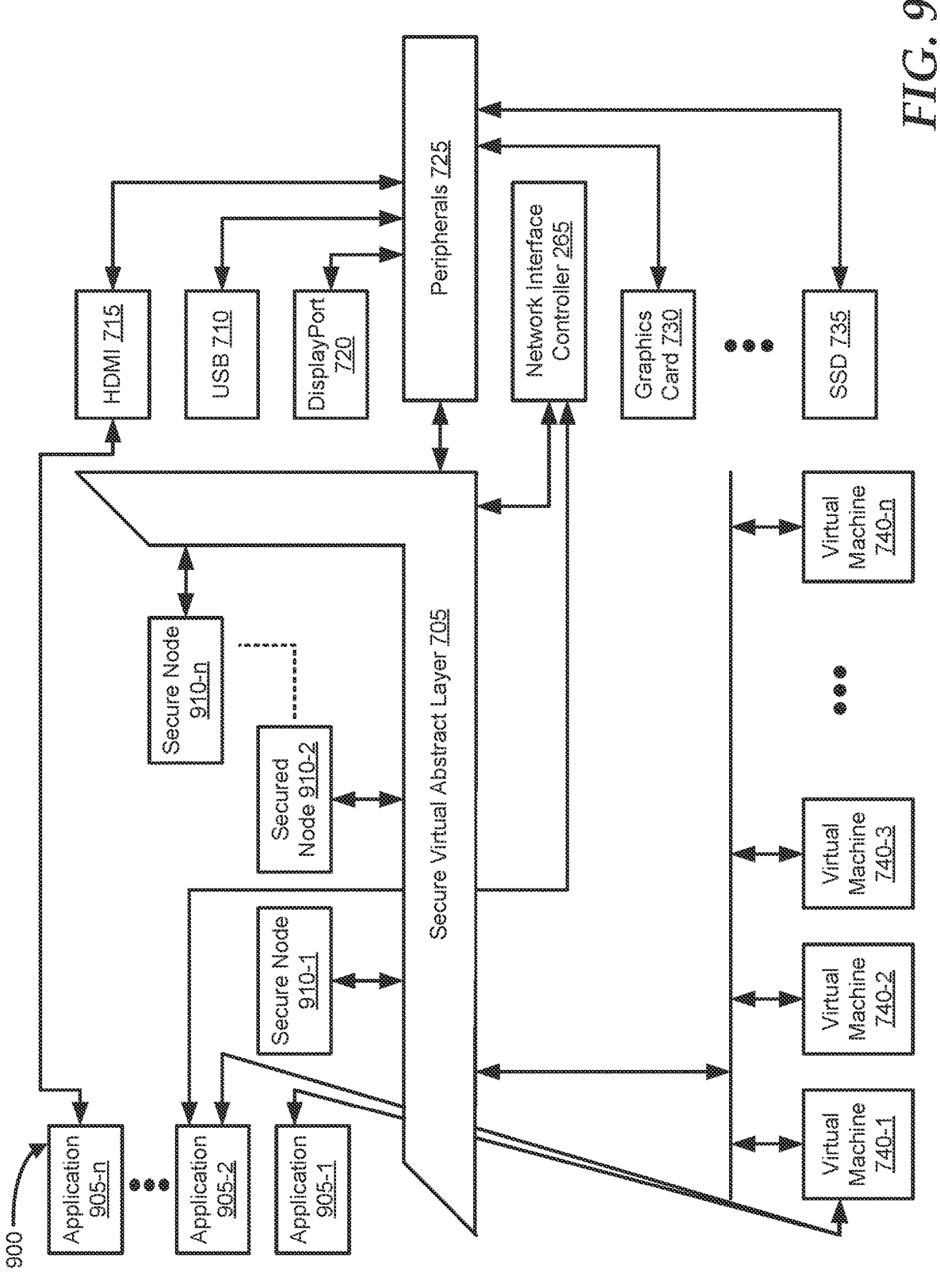
FIG. 9 is a diagram of an architecture for peripheral device data protection, according to an embodiment of the present disclosure.

Method 800 typically starts at block 805 where a processor may create a secure virtual abstraction layer similar to secure virtual abstraction layer 705 of FIG. 7 and FIG. 9. The method may proceed to block 810, where the processor may create one or more virtual nodes, similar to secure nodes 910 of FIG. 9. The method may proceed to block 815, where the processor may create a runtime block hand-off block that is passed by a pre-boot secure zone driver and load a peripheral device firmware memory map driver.

The method may proceed to block 820, where the processor may tag virtual node transactions to peripheral devices, such as one-to-many or many-to-one. The method may proceed to block 825, where the processor may remap address spaces of the peripheral devices to pseudo-drive address spaces and stop enumerating the peripheral address spaces to the operating system or the input/output memory management unit. Instead, the peripheral address spaces may be lined up with the peripheral device firmware memory map driver. The method may proceed to block 830, where the processor may determine process identifier tags of the operating system, virtual machines, or application process and associate the process identifier tags to a virtual node address region. The method may proceed to block 835, where the processor may push the process identifier tags for the virtual node transactions. The method may proceed to block 840, where the processor may upon request from a subscriber close the secure memory zone, remove the security tag assigned to the secure memory zone, and wipe out a memory region allocated to the secure memory zone.

FIG. 9 shows a portion of architecture 700 in greater detail. In this example, secure virtual abstraction layer 705 may use secure nodes 910-1 through 910-5 as a passthrough for peripheral data transactions and/or hypervisor and virtual machine shared transactions from applications 905-1 through 905-n. This is performed to hide their allocated memory from other peripheral devices, the hypervisor, or other virtual machines. Accordingly, only the peripheral device and/or virtual machine may be able to access its allocated memory.

For example, secure virtual abstraction layer 705 may be configured to pass peripheral transactions through re-mapped virtual nodes, such as secure nodes 910, that were created at pre-boot. These virtual nodes may provide filtering-based protection for the peripheral data transactions and hypervisor and virtual machine-shared transactions. In addition, secure virtual abstraction layer 705 may provide data filtering-based protection while providing a remapped address space to avoid virtual machine, operating system, or container-level data corruptions or vulnerabilities. Further, secure virtual abstraction layer 705 may provide a secure data tunnel at runtime using secure nodes 910 via the firmware memory zone protection protocol.

FIG. 10 shows a table 1000 of a secure memory request data format or structure from a peripheral subsystem. Table 1000 includes a source 1005, a destination 1010, a parent globally unique identifier (GUID) 1015, a child flag 1020, a child GUID 1025, and a tag level 1035. Source 1005 may be one of a virtual machine, a cloud service, an SSD or similar, a peripheral device, a graphics card, a network interface controller, etc. Destination 1010 may also be one of a virtual machine, a cloud service, an SSD or similar, a peripheral device, a graphics card, a network interface controller, etc. Parent GUID 1015 may be a GUID associated with source 1005 which may also be the requester. Child flag 1020 may be a binary value indicating a status of whether a child GUID is included in the request whereas child GUID 1025 may be a GUID of the requester's child device. Memory size 1030 may refer to the memory size to be assigned in the secure memory zone also referred to as a volatile protected execution zone. Tag level 1035 may refer to a security tag level based on the context of one of the virtual machines, an operating system, a hypervisor, a BIOS, a container, etc.

A peripheral device or a customer of a secure virtual abstraction layer may send a memory request to get a virtual memory for their secured transaction. The request which may be of the structure depicted in table 1000 is made at the peripheral device level and tagged using the parent GUID. The child GUID may also be included if the peripheral device, such as a dock, has multiple hosts. The secure nodes, which are similar to secure nodes 910, may be created and associated with a secure virtual abstract layer to handle data transactions and set up individual tunnels for end-to-end memory access. The secure nodes may be used to support one-to-many as well as many-to-one access. For example, as depicted in FIG. 9, a virtual machine can access two applications while an application can access two peripheral devices at the same time.

FIG. 11 shows a table 1000 of a secure memory response data format or structure to a peripheral subsystem. Table 1100 includes source 1005, destination 1010, parent globally unique identifier (GUID) 1015, child flag 1020, child GUID 1025, tag level 1035, an allocated memory offset 1105, and a security tagging 1110. Allocated memory offset 1105 may refer to a memory offset provided by a virtual node for a virtual memory zone protocol. Allocated memory offset 1105 may be restricted to the memory length requested. This memory may be virtualized by the DMA and the IOMMU. Security tagging 1110 may refer to a volatile protected execution zone provided during the execution of the sensitive data while cross-data protection may be provided by the secure nodes.

As used herein, a hyphenated form of a reference numeral refers to a specific instance of an element and the un-hyphenated form of the reference numeral refers to the collective or generic element. Thus, for example, data packets "605-1" refers to an instance of a data packet class, which may be referred to collectively as data packets "605" and any one of which may be referred to generically as a data packet "605."

Although FIG. 5 and FIG. 8 show example blocks of method 500 and method 800 in some implementations, method 500 and method 800 may include additional blocks, fewer blocks, different blocks, or differently arranged blocks than those depicted in FIG. 5 and FIG. 8. Those skilled in the art will understand that the principles presented herein may be implemented in any suitably arranged processing system. Additionally, or alternatively, two or more of the blocks of method 500 and method 800 may be performed in parallel. For example, blocks 515 and 520 of method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents but also equivalent structures.

What is claimed is:

1. A method comprising:

in response to detecting sensitive data in a memory transaction, by a processor, getting a memory allocated to the sensitive data from a secure zone of a dual in-line memory module;

blocking processes from access to the memory by locking the memory from other memory transactions using a cache register bit, wherein the memory is allocated to the sensitive data from the secure zone using security descriptors;

accessing the sensitive data locked by the cache register bit from the secure zone of the dual in-line memory module based on the security descriptors via L1, L2, and L3 caches;

executing the sensitive data in a firmware remapped memory and cache address line of the L1, L2, and L3 caches; and subsequent to the executing of the sensitive data in the memory transaction, storing of the sensitive data at a secured memory zone in a non-volatile memory express storage if the storing is required.

2. The method of claim 1, wherein the security descriptors include an offset associated with the sensitive data.

3. The method of claim 2, further comprising tracking movement of the sensitive data through an execution path by updating the offset.

4. The method of claim 1, wherein another memory allocated for a table for the security descriptors is allocated during a pre-extensible firmware interface initialization phase of a boot process.

5. The method of claim 1, wherein another memory allocated for the security descriptors is a non-volatile memory.

6. The method of claim 1, wherein another memory allocated for a table of the security descriptors is remapped to an operating system low address.

7. The method of claim 1, further comprising limiting the executing of the sensitive data to a process identifier.

8. An information handling system, comprising:

a processor; and a memory storing instructions that when executed causes the processor to perform operations including:

in response to detecting sensitive data in a memory transaction getting a memory allocated to the sensitive data from a secure zone of a dual in-line memory module;

blocking processes from access to the memory by locking the memory from other memory transactions using a cache register bit, wherein the memory is allocated to the sensitive data from the secure zone using security descriptors;

accessing the sensitive data from the secure zone of the dual in-line memory module based on the security descriptors via L1, L2, and L3 caches;

executing the sensitive data of the memory transaction in a firmware remapped memory and cache address line of the L1, L2, and L3 caches; and subsequent to the executing of the sensitive data, storing of the sensitive data at a secured memory zone in a non-volatile memory express storage if the storing is required.

9. The information handling system of claim 8, wherein the security descriptors include an offset associated with the sensitive data.

10. The information handling system of claim 9, wherein the operations further comprise tracking movement of the sensitive data through an execution path by updating the offset.

11. The information handling system of claim 8, wherein another memory allocated for a table for the security descriptors is allocated during a pre-extensible firmware interface initialization phase of a boot process.

12. The information handling system of claim 8, wherein another memory allocated for the security descriptors is a non-volatile memory.

13. The information handling system of claim 8, wherein another memory allocated for a table of the security descriptors is remapped to an operating system low address.

14. The information handling system of claim 9, wherein the operations further comprise limiting the executing of the sensitive data to a process identifier.

15. A non-transitory computer-readable medium to store instructions that are executable to perform operations comprising:

in response to detecting sensitive data in a memory transaction, getting a memory allocated to the sensitive data from a secure zone of a dual in-line memory module;

blocking processes from access to the memory by locking the memory from other memory transactions using a cache register bit, wherein the memory is allocated from the secure zone using security descriptors;

accessing the sensitive data locked by the cache register bit from the secure zone of the dual in-line memory module based on the security descriptors via L1, L2, and L3 caches;

executing the sensitive data of the memory transaction in a firmware remapped memory and cache address line of the L1, L2, and L3 caches; and subsequent to the executing of the sensitive data, storing of the sensitive data at a secured memory zone in a non-volatile memory express storage if the storing is required.

16. The non-transitory computer-readable medium of claim 15, wherein the security descriptors include an offset associated with the sensitive data.

17. The non-transitory computer-readable medium of claim 16, wherein the operations further comprise tracking movement of the sensitive data through an execution path by updating the offset.

18. The non-transitory computer-readable medium of claim 15, wherein another memory allocated for a table for the security descriptors is allocated during a pre-extensible firmware interface initialization phase of a boot process.

19. The non-transitory computer-readable medium of claim 15, wherein another other memory allocated for the security descriptors is a non-volatile memory.

20. The non-transitory computer-readable medium of claim 15, wherein another memory allocated for a table of the security descriptors is remapped to an operating system low address.

* * * * *